Aug. 7, 1962     A. M. WARN     3,048,142
SAFETY ALARM SIGNAL FOR ROTATING BODIES

Filed April 11, 1961     2 Sheets-Sheet 1

ARTHUR M. WARN
*INVENTOR.*

BY

Aug. 7, 1962   A. M. WARN   3,048,142
SAFETY ALARM SIGNAL FOR ROTATING BODIES
Filed April 11, 1961   2 Sheets-Sheet 2
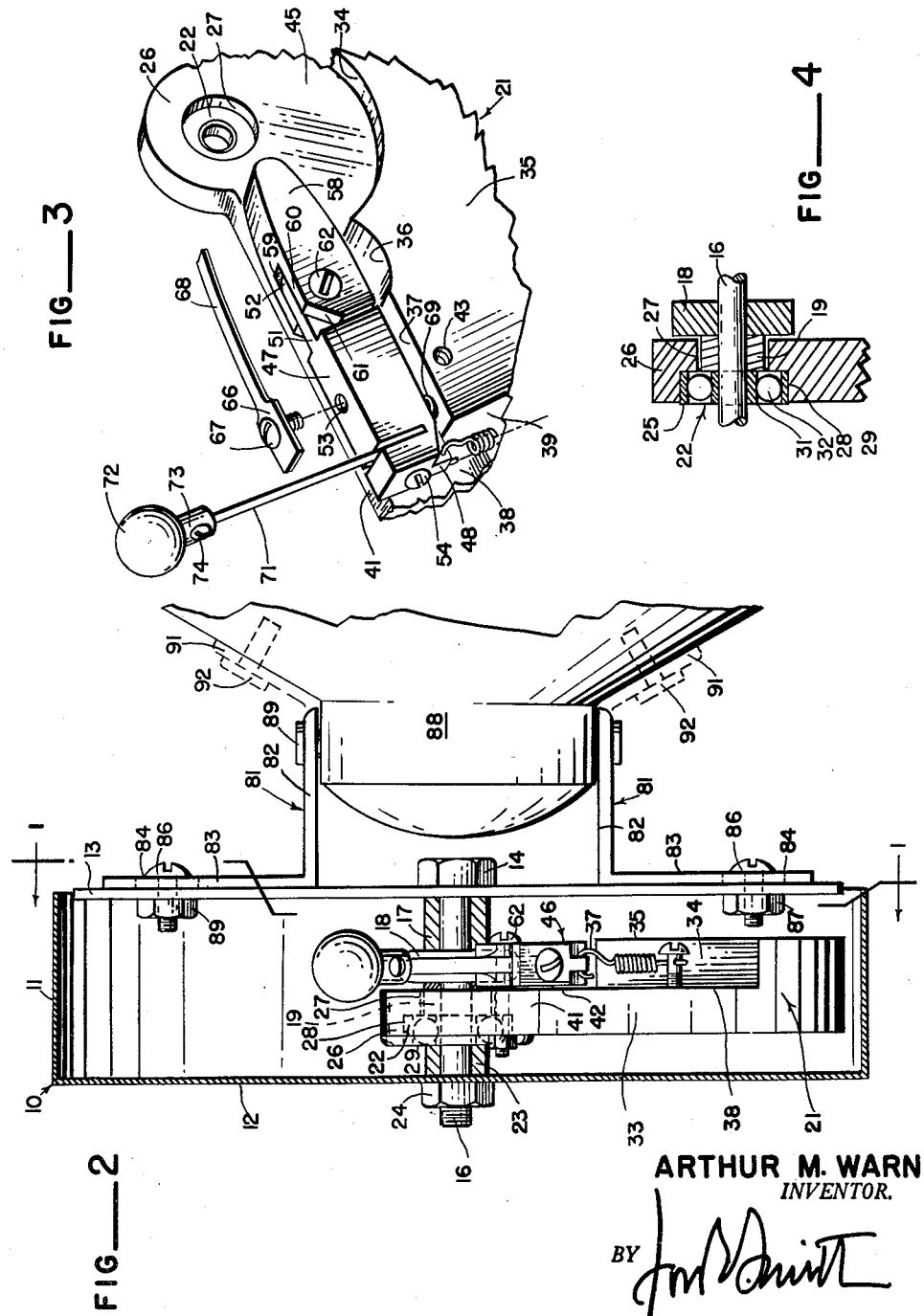
ARTHUR M. WARN
INVENTOR.

United States Patent Office 3,048,142
Patented Aug. 7, 1962

3,048,142
SAFETY ALARM SIGNAL FOR ROTATING BODIES
Arthur M. Warn, P.O. Box 6064 Riverton Branch,
Seattle 88, Wash.
Filed Apr. 11, 1961, Ser. No. 102,264
5 Claims. (Cl. 116—60)

This invention relates to a new and useful safety alarm signal for vehicle wheels and other rotating bodies.

The broad purpose of this invention is to provide a safety alarm signal for vehicles such as trucks, tractors, fork lift trucks, and the like, which are operated in areas in which there are people exposed to the danger of being struck by a vehicle. For example, loading and unloading docks and platforms, piers, warehouses and stockrooms may require the use of such vehicles where people are likely to be moving about by foot. Similarly, this invention may be attached to other rotating bodies such as gears, sprockets and flywheels. In like manner, this invention may be attached to the wheels of vehicles which move on tracks. In any event, this device attached to the rotating body or wheel will impart a warning to persons nearby who may be engaged in other activity or whose attention may be diverted away from the dangers of a nearby moving vehicle or body. Similarly this device is designed to warn individuals whom the driver may have failed to see.

This invention accomplishes the above stated purpose by providing a counterweight freely suspended on a shaft, to which counterweight are secured two bell clappers. The clappers are actuated by a cam fixedly secured on the shaft and a cam follower mechanism on the counterweight. A bell is secured to the shaft and as the shaft, bell, and cam rotate the clappers are actuated to strike the bell and produce a clear, audible ringing noise.

This invention also has as an object to provide a vehicle with a safety alarm signal which produces a continuous audible alarm in either or both directions of travel of the vehicle.

Another object is the provision of a signalling device of the character described which is entirely self-contained, requiring no electrical, mechanical, hydraulic or other external power or motive connections, and which, despite the fact that it contains movable parts, requires only rigid attachment to the vehicle wheel. In general, the motive power is provided by relative movement between certain parts which rotate with a wheel of the vehicle and certain other parts which are restrained against rotation by a counter, pendulum or eccentric-type weight.

Yet another object of this invention is to provide a safety alarm signal for vehicles which is simple and economical in construction, efficient and dependable in operation, and readily adaptable to any type of rotating body or wheel.

With these objectives in view, as well as other objects which will appear in the course of the specification, reference may be had to the following drawings, wherein:

FIGURE 2 is a side elevational view of the invention with a portion of the bell cut away for convenience of illustration and showing the manner in which the device is attached to a wheel hub;

FIGURE 3 is a perspective view on an enlarged scale of an upper portion of the counterweight with striker and striker actuating mechanism;

FIGURE 4 is a section view of the counterweight hub, shaft and cam taken along the line 4—4 of FIG. 1;

*The Bell*

Figure 1:
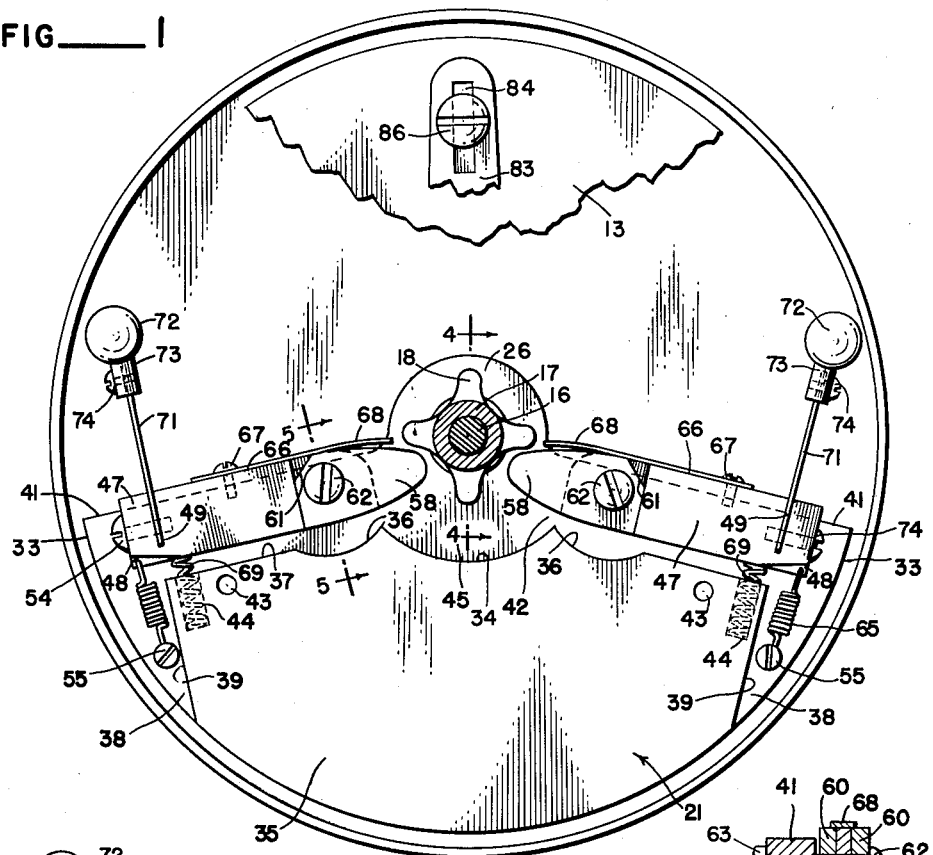
FIGURE 1 is a rear elevational view of the inside of the alarm signal taken along line 1—1 of FIG. 2.

Referring to the drawings in detail it will be seen that the embodiment of the invention illustrated comprises a sounding bell, generally designated as number 10, in the form of a shallow steel cylinder, closed at one end and open at the other end. However, the bell may also be of other shapes such as, for example, concavo-convex as a conventional alarm gong, or even conical. Furthermore, it is contemplated that the bell may be made of metals other than steel.

Bell 10 comprises circular end wall 12 having a flange or cylindrical side wall 11 around its edge. Bell 10 is provided with an aperture at its axis to receive shaft 16 of bolt 14. Within bell 10 and abutting end wall 12 is a spacer sleeve 23 which is slidably received on shaft 16 and which spaces counterweight 21 from end wall 12.

*The Counterweight*

The mass of weight 21 is disposed eccentrically of shaft 16. Weight 21 rotates freely on shaft 16 and since it normally hangs downwardly because of gravity, it prevents parts attached to it from rotating as the shaft turns. The weight 21 may be of any form or contour so long as it contains enough mass below the hub 26 to counterbalance friction and the force imparted to the striker actuating mechanisms by the actuating cam. Preferably weight 21 is formed of heavy plate metal and in general is less than fully semi-circular in shape as may be seen in FIG. 1.

More specifically the weight, in order to conveniently accommodate the strikers and the striker actuating arms, is machined to provide operating surfaces for moving parts. Hub 26 is a rounded portion at the top center of the weight and has a hole or aperture at the center thereof which center is coaxial with the axis of the bell and the weight to receive shaft 16. The outside surfaces of hub 26 below the center point of the hub slope outwardly and downwardly toward the wall 11 of bell 10 to form top weight edges 41. Top edges 41 extend to within a slight distance of wall 11 and then join bottom or circular weight edge 33 which is defined by a radius projected from the common axis of shaft 16, hub 26 and bell 10.

It will be seen that approximately one-half the thickness of the upper part of weight 21 from side-to-side is formed or machined away to provide offset surfaces. Thus the hub itself is about one-half the thickness of the weight. The offset surfaces extend downwardly from the top weight edge 41 for a distance of approximately one-quarter the length of a radius line from the axis to side wall 11. Furthermore, the weight is provided with recessed surfaces at the wings, or ends, or corners of the weight which surfaces form generally downwardly pointed triangular areas. The area under hub 26 becomes surface 45. The areas directly beneath edges 41 are designated by number 42 and the end surfaces are designated by number 38.

That portion of the weight 21 which is of full thickness is designated by number 35. Note that raised portion 35 is defined at the top by offset edges 34, 36 and 37, at the sides by edges 39 and at the bottom by edge 33.

The hub 26 of weight 21 is best shown in FIGS. 3 and 4. The side of the hub facing bell wall 12 is provided with a circular recessed area 28 approximately three times the diameter of the shaft 16. The same side of the hub is provided with a raised portion 29 which is approximately 1/16 inch in thickness. The area 28 is recessed to about one-half the total thickness of hub 26.

On the opposite side of the hub is circular recessed area 27 which is approximately twice the diameter of the shaft 16. The recessed areas 27 and 28 together form a circular opening through the hub. The larger recessed area 28 is provided with a ball bearing generally designated by number 22, comprising outer race 25, balls 32 and inner race 31. Suitable retaining walls for balls 32 are included but not shown. The outer race 25 fits snugly into the opening 28 and thus does not turn. Race 31, however, rotates freely and of course bears directly on shaft 16. Thus, it may be seen that the weight 21 is freely rotatable on shaft 16. Spacer sleeve 23 which is slidably received on shaft 16 bears directly on bearing 22 and spacer sleeve 19, also slidably received on shaft 16, on the opposite side also bears directly on bearing 22. Neither of the spacer sleeves 19 or 23 bears directly on the inner race 31 to impair its freedom of movement.

Spacer sleeve 19 projects beyond the cam side of hub 26 and abuts cam 18 so that cam 18 is spaced slightly from the face of hub 26.

Actuating Cam

Interchangeable cam 18, which functions as the actuating means for the striker heads, to be more fully described hereinafter, is slidably mounted on shaft 16. Cam 18 is shown to have four lobes, but may be provided with any number of lobes depending on the number of strikes desired per revolution of the bell. The cam, like spacer sleeves 19 and 23 may be made of a variety of materials such as hard wood, metal, plastic or other synthetic compositions which are essentially nonresilient. The spacer sleeves may be exchanged for a series of conventional washers.

Cam 18 is held securely against spacer sleeve 19 by spacer sleeve 17. Although it is not necessary cam 18 may be securely connected to shaft 16 by virtue of a lock screw (not shown). Spacer sleeve 17 in turn abuts supporting plate 13 which has a hole at its axis to be received on shaft 16 of bolt 14. Thus, when nut 24 is threaded on shaft 16, bell 10, bearing 22, spacer sleeves 17, 19 and 23, cam 18 and plate 13 are securely bound together as a single rigid unit.

Striker Mechanism

Since the striker mechanisms are identical, only one will be described. On the offset surface 42 above the concave edge 36 and lying near top edge 41 is pivot pin 62. The pin is located slightly more than one-third the distance from the axis to the wall 11. (See FIGS. 1, 3 and 5.) Pivot pins 62 furnish the shaft about which the actuating arms 46 pivot. The actuating arms 46 are formed of two sections. The main, or supporting, body 47 is generally rectangular in shape. At its forward end supporting body 47 has vertical male member or tongue 51. It will be seen that supporting body 47 extends from a point which is approximately ½ inch from wall 11 to the junction of offset edges 36 and 37. The tongue 51 extends from the hub end of the supporting body to approximately the junction of offset edges 34 and 36. Tongue 51 is about ⅓ the thickness of supporting body 47 and centered between the sides thereof and fully as deep. It will be noted that the top front edge of tongue 51 is rounded as at 52, the purpose of which will be described hereinafter (see especially FIG. 3). Tongue 51 has an aperture or port (not shown) by which supporting body 47 is pivoted on pin 62. It will be seen that supporting body 47 is not quite as deep as surface 42 is wide. The pin 62 and aperture in tongue 51 are so located that body 47 in its normal position sits about ⅛ inch above offset surface 37. Body 47 is about as wide as the offset edges are deep. Thus none of the moving parts attached to weight 21 extend out beyond the plane of the surface of the raised portion 35, with the exception of the heads of pins 62.

The forward or second piece or part of actuating arm 46 is follower 58. Follower 58 abuts the end of supporting body 47 which is nearest the axis and extends toward the axis so that its end will contact the lobes of cam 18. Follower 58 is of the same width and depth as the supporting body. However, it tapers gradually from body 47 toward a rounded nose or point or end which contacts the rounded lobes of cam 18. The nose of follower 58 is normally out of contact with cam 18 except when the cam is rotated to bring a lobe into contact with said follower nose. Thus it will be seen that follower 58 is slightly shorter than supporting body 47. By reference to FIGS. 3 and 5 it may be seen that a groove 59 is cut into the body of follower 58 to accommodate tongue 51. Holes are drilled through the forks 60 to match with the aperture in tongue 51 so that both supporting body 47 and follower 58 swivel on the pivot pin 62.

Figures 5, 6, 7:
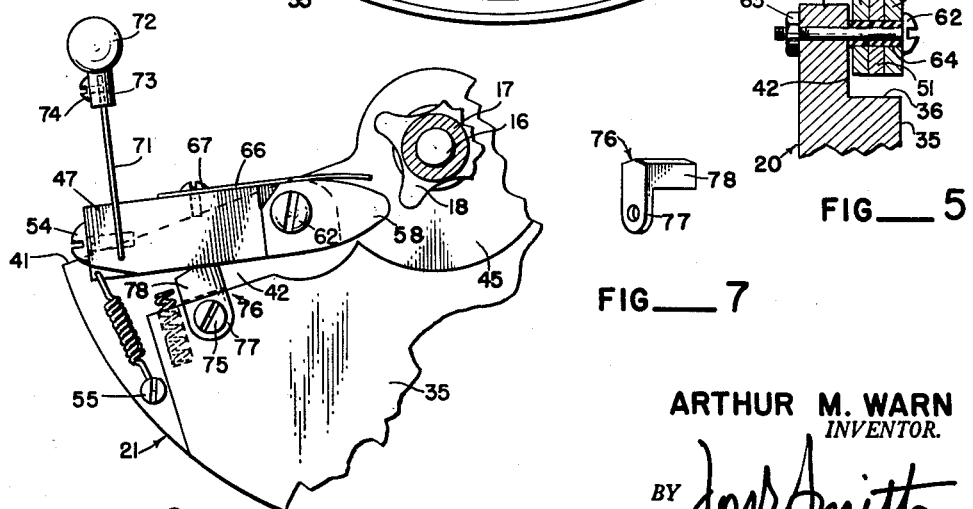
FIGURE 5 is a section view of the pivot area in the striker actuating arm taken along the line 5—5 of FIG. 1.
FIGURE 6 is a front elevational view of an upper portion of the counterweight showing one of the striker actuating mechanisms immobilized.
FIGURE 7 is a perspective view of the immobilizing block used in FIG. 6.

FIG. 5 shows that the apertures in tongue 51 and forks 60 are large enough to receive a bearing sleeve 64 through which pivot pin 62 extends. Sleeve 64 is slightly longer than the width of tongue 51 and forks 60 taken together so that when nut 63 is threaded on pin 62 to firmly secure said pin to weight 21 the actuating arms 46 are not bound and thus left unable to rotate freely on said pin.

It will be noted that the upper corner of each fork 60 is cut off to form a beveled portion 61. The shape of the follower 58 and supporting body 47 taken together as described is such that when the cam rotates so as to contact follower 58 from above, the entire actuating arm pivots about pin 62. On the other hand when the cam rotates in the opposite direction to bring a lobe into contact from under the follower 58, then only follower 58 pivots about pin 62.

Supporting body 47 is retained in the position shown in FIG. 1 by a compression spring 69 which is inserted in hole 44 which in turn is bored into surface 37 at the outer end thereof. Spring 69 serves as a resilient stop for actuating arm 46. The actuating arm 46 is held against spring 69 by tension spring 65 which is anchored at one end to stud 55 on surface 38. The other end of spring 65 is attached to main body 47 by provision of a small triangular tongue 48 at the bottom rear of said main body. The tongue 48 is provided by notching triangular pieces out of each of the lower corners leaving said tongue at the center of said body. Tongue 48 has a small hole extending therethrough in which is inserted the other end of spring 65.

In the event follower 58 is pivoted upwardly by the cam it is essential that it be returned to its original position. Leaf spring 68 is provided to accomplish this result. Screw 67 is threaded into the top surface of supporting body 47. An aperture extends through the wide base portion 66 of spring 68 by which said screw attaches the spring to said body (see FIG. 3). Thus when follower 58 is pivoted upwardly by a cam lobe the spring 68 snaps said follower back to its original position when the lobe has disengaged the follower.

A slot 49 is cut through most of the depth of body 47 near the rear end thereof in order to receive the resilient striker arm 71. Screw 54 is threaded into the rear of body 47 and extends through an aperture in the lower part of striker arm 71 to hold said striker arm firmly in said slot 49. The arms extend generally upwardly from the body 47 and have mounted on the upper end thereof striker heads 72. Striker heads 72 have depending therefrom the base portion 73 in which is cut a slot (not numbered) for receiving the upper end of arm 71. Screw 74 extending through base 73 and a hole in arm 71 secures the head 72 rigidly to said arm. The striker head may be made of many metals though it is found that brass for instance and other soft metals will tend to flatten due to repeatedly striking the bell. Thus, ball bearing steel is recommended, though by no means required. Mounted as described, the striker heads are found to be slightly above hub 26 and in close proximity to wall 11 of bell 10 when the actuating arms are in their normal position. The striker arms 71 are made of leaf spring stock.

The manner in which the invention is attached to the vehicle is shown in FIG. 2. Supporting plate 13 is designed to be in radially spaced relation to the open end or edge of side wall 11, and securely attached, as described above to shaft 16 of bolt 14. In addition to its support function, and because it substantially covers the open end of the bell, plate 13 also serves to protect the operation of moving parts within bell 10 from being impaired and obstructed with grease and dirt and other deleterious matter. It is contemplated that shaft 16 may be integrally connected to plate 13, as, for example, by welding it thereto.

Support Apparatus

In order to support the invention on the wheel hub 88 of the particular vehicle it is necessary to fashion three or four brackets, identical to brackets 81 for illustrative purposes, and spaced at either 90° or 120° intervals as may be determined expedient by a person skilled in the art. Brackets 81 have legs 82 and at right angles thereto legs 83. Legs 83 are slotted as at 84 for the purpose of permitting precise adjustment of the invention on the wheel hub 88. It should be noted that the axis of bell 10 and shaft 16 should be as nearly as possible coaxial with the axis of hub 88. Securing brackets 81 to the plate 13 are bolts 86 and nuts 87.

Assembled as described, this invention forms a rigid unit ready for attachment to the vehicle hub.

Legs 82 may be secured to hub 88 by strapping said legs thereto with steel strap 89 having an appropriate tightening or cinching mechanism (not shown). Alternatively, the brackets 81 may be shaped so that third legs such as legs 91, shown in dotted lines, would fit the contour of the wheel to be attached thereto by bolts or screws 92.

Operation

The operation of the safety alarm signal is the same regardless of the direction of travel of the vehicle or the direction of rotation of the rotating body. As the device rotates with the wheel, weight 21 retains as a result of gravity a substantially stationary position below shaft 16. Thus, the actuating arms 46 and striker heads 72 are restrained against rotation. Cam 18 rotates with the bell 10 and shaft 16. The lobes of said cam, depending on direction of rotation, will move into contact with the rounded or blunt end of follower 58 at the upper side of said follower. Since follower 58 pivots free of main body 47 only when contacted from its under side, the rotation just described forces the entire actuating arm 46 to pivot. The nose or end of follower 58 is forced downwardly by the cam lobe and the supporting body 47 is forced upwardly relative to the pivot pin 62. Striker head 72 is moved further away from side wall 11. The follower 58 will disengage itself quite suddenly from the cam lobe as the cam continues to rotate. The result of the disengagement is to snap the actuating arm 46 back to its normal position by virtue of the tension exerted by spring 65. The sudden snap back throws head 72 on the end of resilient supporting arm 71 into contact with side wall 11 to produce the alarm signal.

At the same time another cam lobe is hitting the under side of the nose or end of the other follower 58 and forcing it upwardly about pivot 62. Because of the bevels 61 in the forks 60 of follower 58 and also because of the rounded bevel 52 in tongue 51 of supporting body 47 no force is applied to said main body by said follower. Thus, the follower moves upwardly against the straight leaf spring 68. After further rotation of the cam, the cam lobe disengages follower 58 and the spring 68 snaps the follower back to its normal position wherein the ends of forks 60 abut the offset walls at the hub end of supporting body 47. Thus it will be understood that the other striker head is not actuated and thus does not strike the bell.

The compression spring 69 is seen to provide a resilient stop for the body 47 when it is snapped back to normal position after disengaging a cam lobe. The result of the above described operation is to show that only one striker head hits the bell in any one direction of rotation of a rotating body. There is one striker head for each of the two directions of travel.

A further feature of this invention is shown in FIGS. 6 and 7. Either one (or both) of the striker heads may be immobilized by raising the supporting body 47 and inserting between said body and offset edge 37 the immobilizing block 76. Said block is shown in FIG. 7 and has head 78 and depending base portion 77. A screw 75 is received in the hole in base 77 and then threaded into the recess 43. Block 76 is held firmly by the screw. Raising body 47 swings follower 58 downwardly so that as cam 18 rotates in either direction none of its lobes will engage the nose of follower 58 to produce an alarm signal. Thus, the alarm signal can, if desired, be rendered silent with respect to a certain direction of travel.

It is to be understood that the showing of the device is very diagrammatic and that the invention is capable of many refinements which will readily occur to those skilled in the art. The actuating arms may be located in different positions depending on the shape of the weight. The cams employed may be provided with lobes of varying size so as to give different tones and varying degrees of intensity of sound. In short, this invention has application to most any type of body which rotates, the turning of which should be accompanied by a safety alarm signal. It is obvious that many variations in the form of the follower and the actuating structure could be used without departing from the spirit of the invention. It is intended, therefore, not to be limited except as indicated by the scope of the subjoined claims.

What is claimed is:

1. A rotating body signal alarm for sounding a continuous audible warning of body rotation in either direction of rotation, comprising:
    (a) a shaft mounted on a body for coaxial rotation with said body;
    (b) a bell fixedly mounted on said shaft for rotation therewith;
    (c) a weight freely pivoted on said shaft within said bell and depending from said shaft in a relatively stationary position under the force of gravity;
    (d) a cam having lobes fixedly secured to said shaft for rotation therewith;
    (e) cam follower means pivotally mounted on said weight below and to one side of said cam;
    (f) striker head means connected to said follower means in striking relation to said bell;
    (g) spring means biasing said follower means to a neutral position in which one end of said follower means is slightly spaced from said cam but adapted to be engaged by the lobes on said cam as said cam rotates, whereby said follower means pivots and on disengaging from said cam snaps back to its neutral position to move said striker head means into contact with said bell.

2. A rotating body signal alarm for sounding a continuous audible warning of body rotation in either direction of rotation, comprising:
    (a) a shaft mounted on a body for coaxial rotation with said body;
    (b) a bell fixedly mounted on said shaft for rotation therewith;
    (c) a weight freely pivoted on said shaft within said bell and depending from said shaft in a relatively stationary position under the force of gravity;
    (d) a cam having lobes fixedly secured to said shaft for rotation therewith;
    (e) actuating arm means pivotally mounted on said weight below and to the side of said cam and including cam follower means;
    (f) striker head means attached to said actuating arm means in striking relation to said bell;
    (g) spring means biasing said actuating arm means to a neutral position in which one end of said follower means is slightly spaced from said cam and is positioned to be engaged by the lobes on said cam as said cam rotates, whereby said follower means pivots and on disengaging said cam snaps back to its neutral position to move said striker head means into contact with said bell.

3. A rotating body signal alarm for sounding a continuous audible warning of body rotation in either direction of rotation, comprising:
 (a) a shaft mounted on a body for coaxial rotation with said body;
 (b) a bell fixedly mounted on said shaft for rotation therewith;
 (c) a weight freely pivoted on said shaft within said bell and depending from said shaft in a relatively stationary position under the force of gravity;
 (d) a cam having lobes fixedly secured to said shaft for rotation therewith;
 (e) cam follower means pivotally mounted on said weight below and to one side of said cam;
 (f) a supporting body means abutting said follower means and mounted on the same pivot as said follower means;
 (g) striker head means flexibly mounted on said supporting body means in striking relation to said bell;
 (h) spring means biasing said supporting body means and said follower means to a neutral position in which one end of said follower means is slightly spaced from said cam but adapted to be engaged by the lobes on said cam as said cam rotates, whereby said follower means and said supporting body means pivot and on disengaging said cam snap back to their neutral position to move said striker head means into contact with said bell.

4. A rotating body signal alarm for sounding a continuous audible warning of body rotation in either direction of rotation, comprising:
 (a) a shaft mounted on a body for coaxial rotation with said body;
 (b) a bell fixedly mounted on said shaft for rotation therewith;
 (c) a weight freely pivoted on said shaft within said bell and depending from said shaft in a relatively stationary position under the force of gravity;
 (d) a cam having lobes fixedly secured to said shaft for rotation therewith;
 (e) a pair of actuating arms pivotally mounted on offset surfaces on said weight, each said actuating arm comprising:
  (1) a cam follower mounted on said pivot;
  (2) a supporting body mounted on said pivot and abutting said follower, said follower being located between said supporting body and said cam;
  (3) said supporting body and said follower having a matching tongue and groove connection through which said pivot extends;
  (4) said follower being designed to force said supporting body upwardly about said pivot when said follower swings downwardly and designed to swing upwardly independently of said supporting body;
 (f) a striker head flexibly mounted on said supporting body in striking relation to said bell;
 (g) spring means biasing said supporting body and said follower means to a neutral position in which one end of said follower is slightly spaced from said cam but adapted to be engaged by the lobes on said cam as said cam rotates, whereby said follower and said supporting body pivot and on disengaging said cam snap back to their neutral position to move said striker head into contact with said bell.

5. The structure according to claim 3, in which a spring is mounted on said supporting body to force said follower downwardly to maintain said follower in abutting relation to said supporting body.

References Cited in the file of this patent
UNITED STATES PATENTS

| | | |
|---|---|---|
| 1,263,678 | Keesey | Apr. 23, 1918 |
| 2,802,441 | Epstein | Aug. 13, 1957 |